(No Model.) 3 Sheets—Sheet 1.
J. A. BOWDEN.
FILTER.
No. 456,374. Patented July 21, 1891.
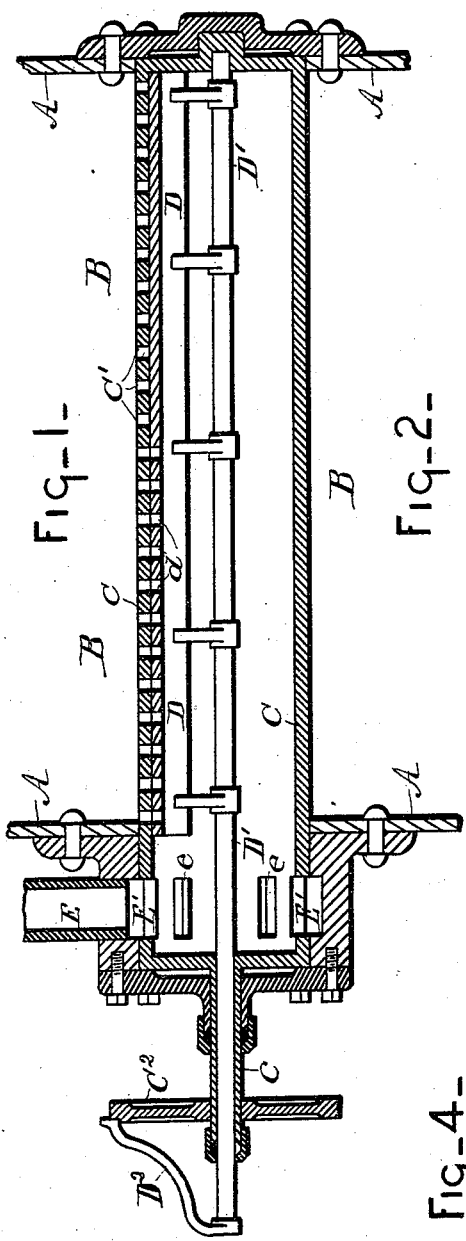
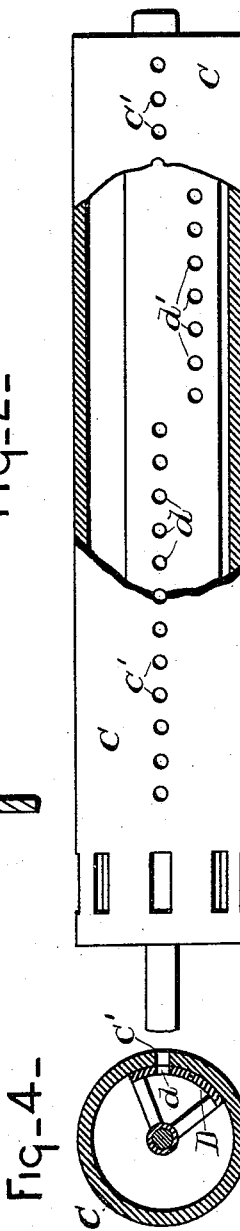
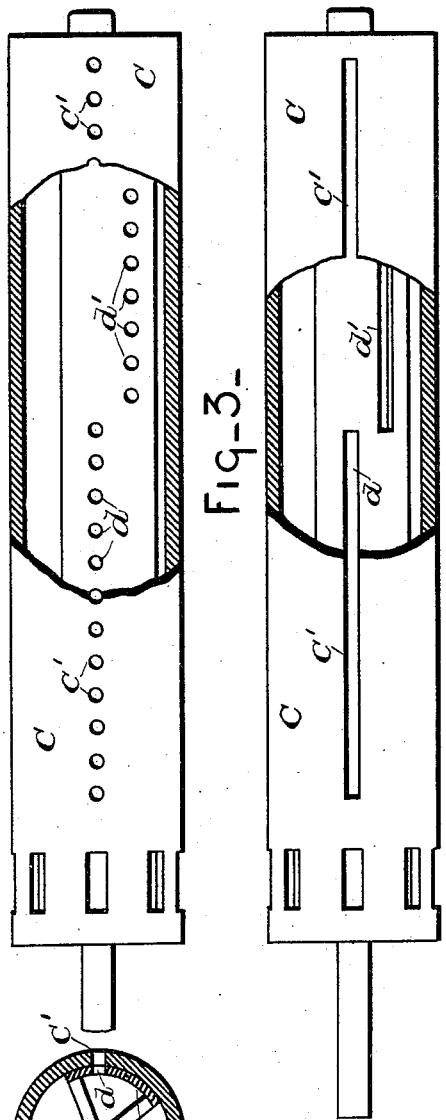
WITNESSES
C. J. Shipley.
W. G. Hodge.
INVENTOR
Junius A. Bowden
By Wells W. Leggett & Co.
Attorneys.

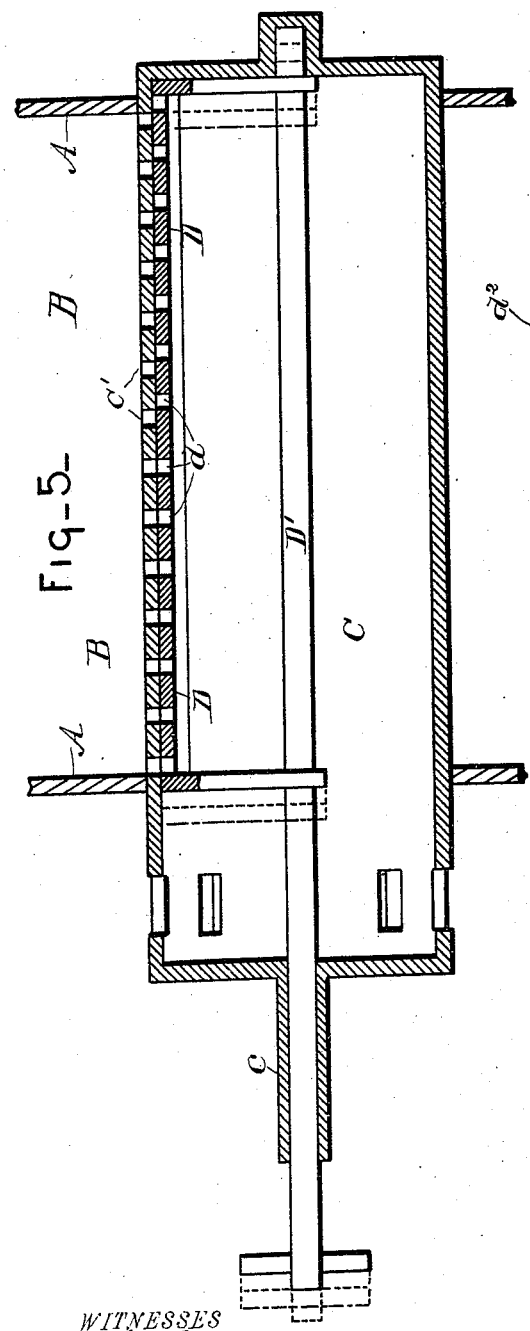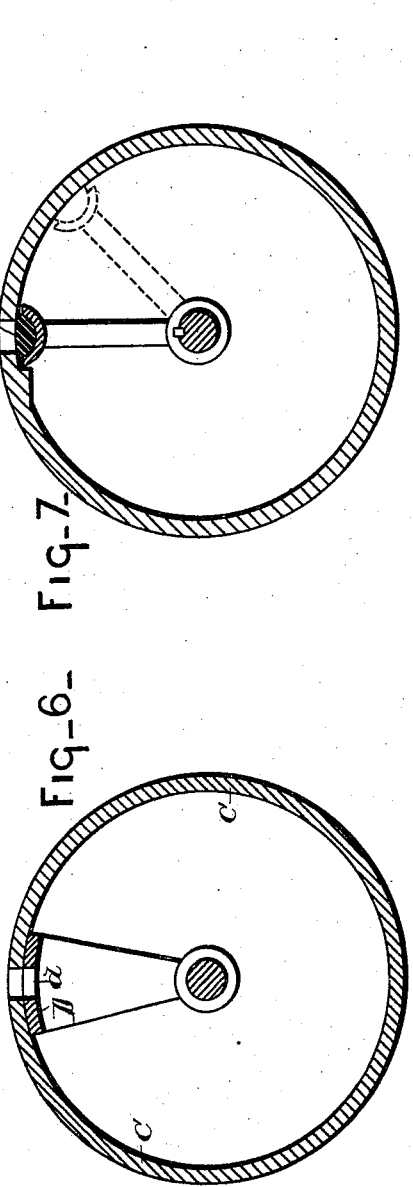

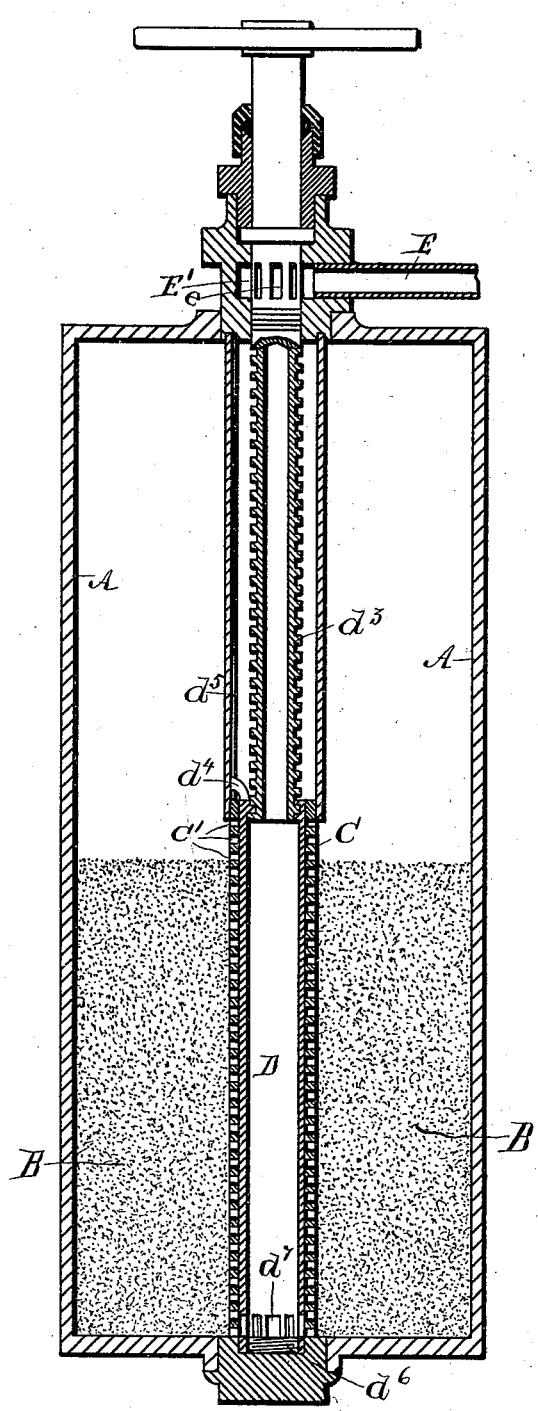

UNITED STATES PATENT OFFICE.

JUNIUS A. BOWDEN, OF DETROIT, MICHIGAN.

FILTER.

SPECIFICATION forming part of Letters Patent No. 456,374, dated July 21, 1891.

Application filed November 22, 1890. Serial No. 372,357. (No model.)

*To all whom it may concern:*

Be it known that I, JUNIUS A. BOWDEN, a citizen of the United States, residing at Detroit, county of Wayne, State of Michigan, have invented a certain new and useful Improvement in Filters; and I declare the following to be a full, clear, and exact description of the invention, such as will enable others skilled in the art to which it pertains to make and use the same, reference being had to the accompanying drawings, which form a part of this specification.

In the drawings, Figure 1 is a sectional view of a filter, illustrating my improvement resting horizontally within the shell or case of the filter. Fig. 2 is a separate view of the said apparatus detached from the filter and illustrating part in section and part in elevation. Fig. 3 is a variation in which slits are employed instead of series of orifices. Fig. 4 is a cross-section of said device. Fig. 5 is a view of a variation in which the orifices are opened or closed by a longitudinal shift or valve with respect to the shell. Fig. 6 is a cross-section of the device shown in Fig. 5, illustrating one form of the valve adapted to shift longitudinally. Fig. 7 illustrates another form in which the valve is made rotary. Fig. 8 illustrates a variation in which the apparatus stands vertically within the filter and the force of the water is directed from the interior through the shell at different elevations as the inner tube is drawn up along its screw-shaft.

It is the purpose of my invention to produce in a filter a washing apparatus whereby the filter-bed may be cleansed of its impurities, and which may be adapted either to a strainer or to an independent washing apparatus, and in the drawings I show it in Figs. 1 to 7 as applied at the base of an upright filter, while in Fig. 8 it is illustrated as applied in upright position extending through the body of filtering material.

My invention consists, essentially, in providing within the filter-bed a perforated cylindrical chamber, said chamber made revoluble and provided with a slot or equivalent series of perforations, and upon the interior of the said chamber a valve provided with perforations corresponding with the perforations in the chamber, the said valve fitting closely against the inner surface of the case or chamber and adapted by a slight shift to open or close said perforations, according as the same may register therewith, the whole constituting a structure which may be turned to direct the water outwardly in any direction therefrom, and when thus turned adapted to cut off the volume of wash-water to a greater or less extent, as may be desired.

In carrying out my invention, A represents the filter-case, B the body of filtering material, and C represents the cylinder or chamber of my washing apparatus. It is provided with a slot or series of perforations C'. This chamber is made revoluble by a hand-wheel C², connected with a neck or stem c, that projects to the exterior of the filter-shell.

D is a valve upon the interior of the case or chamber. It is connected with the valve-stem D', which projects through the neck c, and at its end may be provided with the index-arm D², whereby the valve may be turned or shifted longitudinally, and which will serve to indicate the position of the valve with respect to the chamber or case C. d and d' represent slots or series of orifices in the valve, adapted when properly turned to register with the corresponding slots or series of orifices C' in the case or chamber C. The series of perforations d may extend in a direct line the whole length of the valve, so as to register simultaneously with the corresponding perforations in the shell or case; or they may be arranged, as shown in Figs. 1 and 2, out of line with each other in the valve, so that as the valve is turned they will register alternately with the perforations at one end of the case and then with those at the other end of the case. So, also, as shown in Fig. 3, there may be slots instead of perforations in both the case and the valve.

E represents the inlet-pipe through which the washing-water may be introduced to the interior of the said revoluble cylinder or case. It leads into an annular chamber E', which communicates through one or more openings e with the interior of the cylinder C.

The operation of this device is as follows: At all times when not in use the valve D may be turned so as to close all the orifices C' in the cylinder or case, and so prevent the material of the filter-bed from passing through the orifices C' into the interior of the cylinder. When, however, it is desired to wash the filter-bed, water is turned on through the pipe E, and this enters into the chamber C. The chamber is then revolved so as to bring the perforations C' in any desired position with respect to the filter-bed. The valve D is then turned so as to cause its orifices $d$ to register with the orifices C', thus directing the stream of water through the said orifices into the filter-bed. It is also manifest that while the orifices are thus registered the chamber C may be revolved throughout more or less of its entire circumference without closing off the valve. Again, if the arrangement is substantially as shown in Figs. 2 and 3 one part of the filter-bed may be thus thoroughly washed and the valve be subsequently turned so that the water shall be cut off from the orifices that have been in use and those orifices adjacent to the other end of the cylinder be brought into action by causing the other slot or orifices of the valve to register therewith, after which the chamber may be revolved to any extent desired for the purpose of washing the different adjacent portions of the filter-bed.

While this is designed more particularly as a washer, it is manifest that it might be utilized also as a strainer. It is manifest that this same result may be effected, so far as the valve action is concerned, by making the valve to shift longitudinally and so to open or close the orifices C'. Such a construction is shown in Fig. 5, and of course the orifices may be so arranged as to be all opened and closed simultaneously, or, as shown in said Fig. 5, it may be arranged to open half of them at a time or close them all off. The dotted lines represent the valve in its different positions. Thus in the position shown by the full lines half of the orifices C' are registered. Then by moving it to the first position indicated by the dotted lines this half would be closed off and the remaining half would be opened, while by moving the valve to the next position indicated by the dotted lines all of the orifices would be closed.

If the valve is arranged to revolve, it may be constructed substantially as shown in Fig. 7 and may or may not be provided with packing $d^2$, and if it is made to slide longitudinally it may be arranged as shown in Fig. 6, so as to form a snug bearing with the adjacent portions of the cylinder and prevent grit from insinuating itself between the valve and the cylinder.

In Fig. 8 is presented a variation or modification of said device. In this contrivance the cylinder C is made stationary, while the valve D is made to slide up and down along the screw-shaft $d^3$, which shaft has a longitudinal bore for the passage of the washing-water, and a suitable fork $d^4$ may engage a rib or guide $d^5$, so as to prevent the valve D from turning as the screw-shaft is turned. In this contrivance the filter-bed is washed in strata from the base to the top, instead of the cylinder being turned for this purpose, as in the other constructions. The lower end of the valve D is closed by a plug or in any other suitable way, as shown at $d^6$, and the only opening is the series of orifices $d^7$ at the base of the valve. In this way as the valve rises the water is caused to issue in all directions horizontally from these orifices $d^7$, and as the valve ascends this necessarily washes the whole filter-bed.

While this device is designed more particularly to act solely as a washer, it is manifest that it might be suitably shielded with a screen or netting in the usual way and operate as a strainer, so that water filtered through the filter-bed would enter through the orifices C' and $d^7$ and pass off through the pipe E, and the current be reversed when it is desired to clean the filter-bed. I deem it, however, more desirable that it shall act solely as a washing apparatus.

While I prefer that the interior valve D shall have series of perforations or slots $d$, it is manifest that the valve may itself be made imperforate and be caused to shift bodily onto or off from the said perforations, as shown in Fig. 7, instead of requiring the water to pass through a similar perforation in the valve.

The prime feature wherein this device differs materially from others that have gone before is the provision of the cylinder or chamber C, the same having a series of perforations or a corresponding slot or slots, the said cylinder or chamber being made revoluble about its longitudinal axis, whereby the said openings may be brought opposite any portion of the filter-bed that lies adjacent to the said cylinder or chamber. It is therefore apparent that the device may be made without any interior valve, the slots or perforations C' in the said cylinder or chamber being employed without any valve upon the interior, it being simply necessary to turn on the pressure of washing-water and revolve the said chamber C into any desired position and allowing the orifices to remain open after the washing operation has terminated. I would therefore have it understood that this feature constitutes one of the important features of my invention, whether employed with or without interior valve mechanism.

What I claim is—

1. The combination, with a filter, of a washing apparatus consisting of a revoluble cylinder or chamber provided with a series of slots or perforations and an interior valve adapted to open and close said perforations, and means for revolving said outer chamber, whereby said slots or perforations may be directed against any portion of the filter-bed adjacent to said chamber, substantially as described.

2. The combination, with a filter, of a revoluble cylinder or chamber provided with a series of slots or perforations and an interior perforated valve, means for shifting the perforations of the valve so as to register with part or all of said slots or perforations, and means for revolving the cylinder or chamber so as to bring its series of slots or perforations successively opposite all portions of the filter-bed lying adjacent thereto, substantially as described.

3. The combination, with a filter, of a revoluble cylinder or chamber provided with a series of slots or perforations, a valve upon the interior adapted to be shifted to alternately open or close different sections of said series of slots or perforations, means for revolving the said outer cylinder or chamber to bring its series of slots or perforations opposite any portion of the filter-bed lying adjacent thereto, and means for introducing washing-water into the interior of said chamber, substantially as and for the purposes described.

4. The combination of a perforated cylinder and a valve therein for governing the perforations in the cylinder, the parts being adjustable, substantially as described, for successively directing the water in different radial lines and consecutively discharging it upon different parts of the filter-bed, substantially as described.

5. As a means for cleansing a filter-bed, the combination, with a filter, of a pipe provided with a row of slits or perforations, said pipe located in permanent position in the immediate body of the filter-bed, a water-conduit leading to the interior of said pipe, and means located upon the exterior of the filter, whereby said pipe may be rotated about its own longitudinal axis, thereby in the course of revolution concentrating the stream of wash-water successively against all parts of the contiguous filter-bed.

In testimony whereof I sign this specification in the presence of two witnesses.

JUNIUS A. BOWDEN.

Witnesses:
MARION A. REEVE,
W. H. CHAMBERLIN.